United States Patent
Lawless et al.

(10) Patent No.: US 9,771,481 B2
(45) Date of Patent: Sep. 26, 2017

(54) COMPOSITION AND METHOD FOR INHIBITING CORROSION OF AN ANODIZED MATERIAL

(71) Applicant: The Boeing Company, Chicago, IL (US)

(72) Inventors: Lawrence M. Lawless, Chesterfield, MO (US); Bruce M. Griffin, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 66 days.

(21) Appl. No.: 14/146,777

(22) Filed: Jan. 3, 2014

(65) Prior Publication Data

US 2015/0191604 A1  Jul. 9, 2015

(51) Int. Cl.
| | |
|---|---|
| *B05D 3/00* | (2006.01) |
| *C09D 5/08* | (2006.01) |
| *C08K 3/04* | (2006.01) |
| *H01B 13/00* | (2006.01) |
| *H01B 13/30* | (2006.01) |
| *C09D 5/00* | (2006.01) |
| *C25D 11/24* | (2006.01) |

(52) U.S. Cl.
CPC ............... *C09D 5/08* (2013.01); *C08K 3/04* (2013.01); *C09D 5/00* (2013.01); *C25D 11/24* (2013.01); *H01B 13/0016* (2013.01); *H01B 13/0026* (2013.01); *H01B 13/30* (2013.01)

(58) Field of Classification Search
CPC .................................................. B05D 3/00
See application file for complete search history.

(56) References Cited

U.S. PATENT DOCUMENTS

| | | | |
|---|---|---|---|
| 3,711,313 A * | 1/1973 | Aoshima et al. | 205/201 |
| 3,844,908 A * | 10/1974 | Matsuo et al. | 205/50 |
| 6,777,238 B1 | 8/2004 | Hall et al. | |
| 2004/0011433 A1 | 1/2004 | Shiozaki et al. | |
| 2005/0059757 A1* | 3/2005 | Bredt | B29C 67/0081 524/3 |
| 2005/0121068 A1* | 6/2005 | Sager | H01L 51/4213 136/252 |
| 2006/0040124 A1 | 2/2006 | Oshimi et al. | |
| 2006/0063872 A1* | 3/2006 | Teachout et al. | 524/417 |
| 2008/0213592 A1* | 9/2008 | Goia | B22F 1/0018 428/402 |
| 2008/0279756 A1 | 11/2008 | Zhamu et al. | |

(Continued)

FOREIGN PATENT DOCUMENTS

| | | | | |
|---|---|---|---|---|
| DE | WO 2008152077 A2 * | 12/2008 | | B82Y 30/00 |
| WO | WO 2014/063114 | 4/2014 | | |
| WO | WO 2014/137352 | 9/2014 | | |

OTHER PUBLICATIONS

Zanni et al "Graphite Nanoplatelets and Caenorhabditis elegans: Insights from an in Vivo Model" Nano Lett. 2012, 12, 2740-2744.*

(Continued)

*Primary Examiner* — Nathan Empie
(74) *Attorney, Agent, or Firm* — Walters & Wasylyna LLC

(57) ABSTRACT

A method for inhibiting corrosion of an anodized material including applying to the anodized material a corrosion inhibiting composition that includes a liquid carrier and an electrically conductive nanomaterial dispersed in the liquid carrier.

20 Claims, 10 Drawing Sheets

(56) References Cited

U.S. PATENT DOCUMENTS

| | | | |
|---|---|---|---|
| 2010/0000441 A1* | 1/2010 | Jang | C09D 11/037 106/31.13 |
| 2010/0009094 A1* | 1/2010 | Lochtman et al. | 427/555 |
| 2013/0171517 A1 | 7/2013 | He et al. | |

OTHER PUBLICATIONS

HM-707 Fluorescent Penetrant, Sherwin Incorporated.

Asoh et al., "Conditions for Fabrication of Ideally Ordered Anodic Porous Alumina Using Pretextured Al," *J. Electrochem. Soc.*, col. 148, iss. 4 (2001).

International Search Report and Written Opinion, PCT/US2014/071772 (2015).

\* cited by examiner

COMPOSITION AND METHOD FOR INHIBITING CORROSION OF AN ANODIZED MATERIAL

FIELD

The present disclosure is generally related to corrosion inhibition and, more particularly, to compositions and methods for inhibiting corrosion of anodized materials.

BACKGROUND

Various metals, such as aluminum, are anodized to enhance performance properties. Anodizing is an electrochemical (e.g., electrolytic passivation) process that produces and/or increases the thickness of an oxide coating on the surface of a metal part. For example, metals are commonly anodized to increase corrosion resistance and increase wear resistance. An anodized surface also provides better adhesion for paint, primers and glues than does a bare metal surface. Therefore, anodized structures can be found in various industrial applications, such as in the aerospace and automotive industries.

For example, an anodized metal typically includes an oxide layer or coating on a surface of a substrate. Although anodizing produces a very regular and uniform coating, microscopic fissures in the coating can lead to corrosion. Further, the coating is susceptible to chemical dissolution in the presence of high and low pH chemistry, which results in stripping the coating and corrosion of the substrate. For example, the oxide layer is generally columnar, cellular, and porous and the pores may facilitate corrosion of the underlying substrate. Therefore, various techniques have been developed in an attempt to inhibit corrosion of anodized metals by reducing the number of pores (e.g., fissures), inserting more chemically stable compounds into the oxide coating, or both.

As one example, the open pores can be sealed (e.g., through hydro-thermal sealing or precipitating sealing), such as with a hot dichromate solution after anodizing. The addition of the sealing step may significantly improve the corrosion resistance of the anodized metal by reducing porosity and interstitial pathways that allow for corrosive ion exchange between the external surface and the substrate. However, the hot dichromate solution contains hexavalent chromium, which requires special attention to handling and disposal.

Accordingly, those skilled in the art continue with research and development efforts in the field of corrosion inhibition of anodized metals.

SUMMARY

In one aspect, disclosed is a method for inhibiting corrosion of an anodized material. The method may include the step of applying to the anodized material a composition including a liquid carrier and an electrically conductive nanomaterial dispersed in the carrier.

In another aspect, the disclosed corrosion inhibiting composition may include a liquid carrier and an electrically conductive nanomaterial dispersed in the carrier.

In yet another aspect, the disclosed method for inhibiting corrosion of an anodized material, such as an oxide layer of a substrate, may include the steps of (1) applying to the anodized material a corrosion inhibiting composition including a liquid carrier and an electrically conductive nanomaterial dispersed in the carrier; (2) allowing the corrosion inhibiting composition to dwell on the anodized material; (3) removing excess quantities of the corrosion inhibiting composition from the material; and (4) drying the corrosion inhibiting composition.

Other aspects of the disclosed composition and method for inhibiting corrosion in an anodized material will become apparent from the following detailed description, the accompanying drawings and the appended claims.

DETAILED DESCRIPTION

Figure 1:
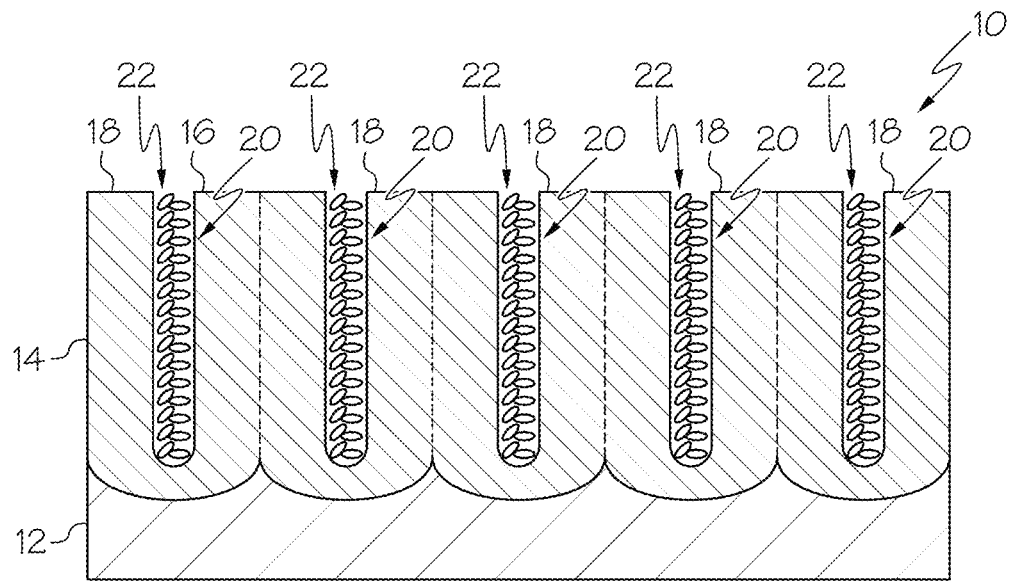
FIG. 1 is a schematic cross-sectional view of an anodized structure treated with the disclosed corrosion inhibiting composition.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

It has now been discovered that the introduction of an electrically conductive nanomaterial into a pore, such as the pores in an oxide layer of an anodized metal, may inhibit corrosion. Without being limited to any particular theory, the electrically conductive nanomaterial may form an electrical circuit array within the pores of the oxide layer, thereby dispersing any localized electrical nodes that may facilitate electrochemical corrosion reactions.

FIG. 1 illustrates an anodized structure, generally designated 10, that has been treated with the disclosed corrosion inhibiting composition in accordance with one aspect of the present disclosure. The anodized structure 10 may include a substrate 12 and an oxide layer 14. The oxide layer 14 (e.g., the anodic layer) may define the external surface 16 (e.g., the anodized surface) of the anodized structure 10. The oxide layer 14 may define a plurality of columnar cells 18 having a plurality of pores 20.

The substrate 12 may be any substrate capable of supporting and/or forming the oxide layer 14. As one general, non-limiting example, the substrate 12 may be metal or metal alloy. As one specific, non-limiting example, the substrate 12 may be aluminum or aluminum alloy capable of forming an aluminum oxide layer. In other specific, non-limiting examples, the substrate 12 may be titanium, zinc, magnesium, niobium, zirconium, hafnium, tantalum, iron, steel, and alloys of the same.

The oxide layer 14 may be extremely hard, non-conductive, and an excellent base for paint. For example, anodized aluminum may have increased corrosion resistance, increased surface hardness, improved lubrication, and/or improved adhesion. Further, the aluminum oxide layer may be non-conductive and allow for dyeing (e.g., coloring).

The oxide layer 14 may be formed on the substrate 12 by any suitable method. For example, an anodized aluminum oxide layer may be grown by passing a direct current through an electrolytic solution, with an aluminum substrate serving as the anode (e.g., the positive electrode). The current may release hydrogen at the cathode (e.g., the negative electrode) and oxygen at the surface of the aluminum substrate, creating a build-up of the aluminum oxide layer.

Electrically conductive nanomaterial 22 may be positioned in the pores 20 of the oxide layer 14 after the anodized structure 10 (e.g., the exterior surface 16 defined by the oxide layer 14) has been treated (e.g., sealed) with the disclosed corrosion inhibiting composition, as is discussed in greater detail herein. The electrically conductive nanomaterial 22 received in the pores 20 of the oxide layer 14 may inhibit corrosion of the underlying substrate 12.

The electrically conductive nanomaterial 22 may include any material or combination of materials that conducts electricity and that has at least one dimension (e.g., width; diameter; thickness) smaller than 1000 nm. The electrically conductive nanomaterial 22 may be inert and include a variety of forms, sizes and conductivities. The electrically conductive nanomaterial 22 may be introduced and held in the pores 20 of the oxide layer 14 (e.g., anodized aluminum oxide layer) and act to disperse any localized electrical current that may develop into a pit (e.g., as corrosion is an electrochemical event).

In one expression, at least a portion of the electrically conductive nanomaterial 22 may have at least one dimension ranging from about 1 to about 500 nanometers. In another expression, at least a portion of the electrically conductive nanomaterial 22 may have at least one dimension ranging from about 1 to about 100 nanometers. In another expression, at least a portion of the electrically conductive nanomaterial 22 may have at least one dimension ranging from about 1 to about 50 nanometers. In yet another expression, at least a portion of the electrically conductive nanomaterial 22 may have at least one dimension ranging from about 1 to about 10 nanometers.

Referring still to FIG. 1, those skilled in the art will appreciate that the size and conductivity of the electrically conductive nanomaterial 22 used in the disclosed corrosion inhibiting composition may be dictated by the size of the pores 20 into which the electrically conductive nanomaterial 22 is intended to be introduced. For example, smaller pores 20 may require using finer electrically conductive nanomaterial 22 having a sufficiently high conductivity. As another example, larger pores 20 may require using larger electrically conductive nanomaterial 22 having a sufficiently high conductivity.

The composition of the electrically conductive nanomaterial 22 may not be limiting, as various compositions may be used. For example, the electrically conductive nanomaterial 22 may include carbon nanomaterial (e.g., graphene nanomaterial), carbide nanomaterial and the like.

Various nanomaterial structures may be used. For example, the electrically conductive nanomaterial 22 may include nanoplatelets, nanotubes, nanorods, nanowires, nanoparticles, nanopowders, nanofibers, nanofilaments and the like.

The disclosed corrosion inhibiting composition may include a carrier for the electrically conductive nanomaterial 22. The electrically conductive nanomaterial 22 may be dispersed in the carrier, such as by agitating a mixture of the carrier and the electrically conductive nanomaterial 22. Additional components, such as dispersants, may be included in the corrosion inhibiting composition without departing from the scope of the present disclosure.

The carrier may be any fluid suitable for carrying and/or suspending the electrically conductive nanomaterial 22 and dispersing the electrically conductive nanomaterial 22 upon a surface of the substrate 12. The concentration of electrically conductive nanomaterial 22 to the carrier should be sufficiently high to provide an effective amount of the electrically conductive nanomaterial 22 within the pores 20, but should not be so high as to interfere with the flow properties of the corrosion inhibiting composition.

As an example, the carrier and the electrically conductive nanomaterial 22 may be mixed at various concentrations, while still being capable of delivering the electrically conductive nanomaterial 22 into the pores 20 of the oxide layer 14 of the anodized structure 10. In one implementation, the concentration of the electrically conductive nanomaterial 22 to the carrier may range from about 1 gram per liter to about 10 grams per liter. In another implementation, the concentration of the electrically conductive nanomaterial 22 to the carrier may range from about 2 grams per liter to about 5 grams per liter. In yet another implementation, the concentration of the electrically conductive nanomaterial 22 to the carrier may be about 5 grams per liter.

As another example, the carrier and the electrically conductive nanomaterial 22 may be mixed at various weight ratios, while still being capable of delivering the electrically conductive nanomaterial 22 into the pores 20 of the oxide layer 14 of the anodized structure 10. In one implementation, the weight ratio of the carrier to the electrically conductive nanomaterial 22 may range from about 120:1 to about 30:1. In another implementation, the weight ratio of the carrier to the electrically conductive nanomaterial 22 may range from about 100:1 to about 50:1. In another implementation, the weight ratio of the carrier to the electrically conductive nanomaterial 22 may range from about 80:1 to about 60:1. In yet another implementation, the weight ratio of the carrier to the electrically conductive nanomaterial 22 may be about 60:1.

In one implementation, the carrier may be a liquid and may have a surface tension suitable to allow the carrier to penetrate relatively large fissures, such as larger pores 20 (e.g., pores being larger than about 150 nm in diameter) in the oxide layer 14. In one realization, the carrier may have a surface tension between about 40 dynes/cm and 72 dynes/cm. In another implementation, the carrier may be a liquid and may have a relatively low surface tension to allow the carrier to penetrate relatively small fissures, such as smaller pores 20 (e.g., pores being between about 10-150 nm in diameter) in oxide layer 14. In one realization, the carrier may have a surface tension of at most about 35 dynes/cm. In another realization, the carrier may have a surface tension of at most about 30 dynes/cm. In another realization, the carrier may have a surface tension of at most about 25 dynes/cm. In yet another realization, the carrier may have a surface tension of at most about 20 dynes/cm.

Those skilled in the art will appreciate that the size of the pores 20 may depend on various anodization properties, including, but not limited to, solution concentration, solution temperature, current density, and the like.

Various carrier compositions may be employed to achieve the desired surface tension. The carrier may include a single liquid component or a mixture of liquid components to achieve the desired surface tension. For example, the carrier may be or may include water, such as deionized water. The carrier may be or may include a surfactant, such as ethoxylated alcohol.

As one general, non-limiting example, the carrier may be or may include a liquid penetrant solution, such as a liquid penetrant solution used to perform a dye penetration inspection. As one specific, non-limiting example, the carrier may be or may include HM-707 fluorescent penetrant solution, which is commercially available from Sherwin, Inc., of South Gate, Calif. Those skilled in the art will appreciate that inclusion of a dye in the carrier is optional.

Figure 2:
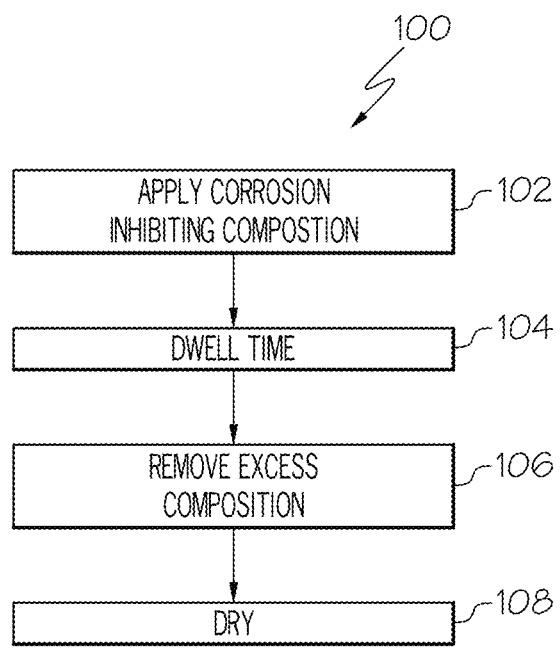
FIG. 2 is a flow chart depicting one embodiment of the disclosed method for inhibiting corrosion.

Referring to FIG. 2, also disclosed is a method 100 for inhibiting corrosion of an anodized material. The anodized material may be an anodized structure, such as the anodized structure 10 shown in FIG. 1, and may include a substrate 12 having an oxide layer 14 including a plurality of pores 20.

At Block 102, the disclosed corrosion inhibiting composition may be applied to the material. For example, the disclosed corrosion inhibiting composition may be applied to the external surface 16 of the anodized structure 10 shown in FIG. 1.

Various techniques may be used to apply the disclosed corrosion inhibiting composition to the material (e.g., the anodized structure 10). As one non-limiting example, the disclosed corrosion inhibiting composition may be wiped and/or brushed onto the material. For example, the disclosed corrosion inhibiting composition may be painted onto the external surface 16 (e.g., the oxide layer 14) of the anodized structure 10. As another non-limiting example, the disclosed corrosion inhibiting composition may be sprayed onto the material. As yet another non-limiting example, the material may be immersed (e.g., dipped) into the disclosed corrosion inhibiting composition.

At Block 104, the disclosed corrosion inhibiting composition may be allowed to dwell on the material. As one non-limiting example, the disclosed corrosion inhibiting composition may dwell on the material for at least 5 minutes. As another non-limiting example, the disclosed corrosion inhibiting composition may dwell on the material for at least 15 minutes. As another non-limiting example, the disclosed corrosion inhibiting composition may dwell on the material for at least 30 minutes. As another non-limiting example, the disclosed corrosion inhibiting composition may dwell on the material for at least 1 hour. As yet another non-limiting example, the disclosed corrosion inhibiting composition may dwell on the material for at least 5 minutes and at most 2 hours.

At Block 106, excess quantities of the disclosed corrosion inhibiting composition may be removed from the material. For example, excess quantities of the disclosed corrosion inhibiting composition may be removed from the external surface 16 of the anodized structure 10 shown in FIG. 1. The removal step (Block 106) may be performed after the dwell step (Block 104), but both removal without the dwell step and removal before the dwell step are also contemplated.

Various techniques may be used to remove excess quantities of the disclosed corrosion inhibiting composition from the material. As one non-limiting example, excess quantities of the disclosed corrosion inhibiting composition may be wiped away with a clean, dry wipe (e.g., cheesecloth; paper towel; cloth towel; rag). As another non-limiting example, excess quantities of the disclosed corrosion inhibiting composition may be wiped away with a dry wipe followed (e.g., immediately) by another wiping with a moistened (e.g., water moistened; solvent moistened) wipe. As another non-limiting example, excess quantities of the disclosed corrosion inhibiting composition may be wiped away with a moistened (e.g., acetone moistened) wipe. As yet another non-limiting example, excess quantities of the disclosed corrosion inhibiting composition may be washed away (e.g., with a water spray or sponge).

At Block 108, the disclosed corrosion inhibiting composition on the material may be dried. As one non-limiting example, drying may be performed at room temperature for a sufficient amount of time (e.g., 24 hours). As another non-limiting example, drying may be performed at elevated temperatures, such as in an oven.

EXAMPLES

Example 1

Corrosion Inhibiting Composition

A first corrosion inhibiting composition was prepared by combining (e.g., mixing) deionized water and industrial quality graphene nanoplatelets (thickness 2 to 10 nm) at a concentration of 5 grams of graphene nanoplatelets per liter of deionized water. The mixture was agitated (e.g., stirred) constantly.

Example 2

Corrosion Inhibiting Composition

A second corrosion inhibiting composition was prepared by combining HM-707 fluorescent penetrant solution (from Sherwin, Inc.) and industrial quality graphene nanoplatelets (thickness 2 to 10 nm) at a weight ratio (penetrant solution to graphene nanoplatelets) of 60:1. The mixture was stirred constantly.

Example 3

Salt Fog Testing

Fifteen identical anodized test panels of 2024-T3 bare aluminum were obtained for testing. All of the panels were first alkaline cleaned and deoxidized. After rinsing, the panels were placed in an anodizing tank and a current was ramped up at the rate of 4 volts per minute until 19 volts were reached. The voltage was maintained at 19 volts for 35 minutes. The panels were then removed and rinsed. Three panels were used for each post-anodized seal treatment, as described in more detail herein below.

Figure 3A:
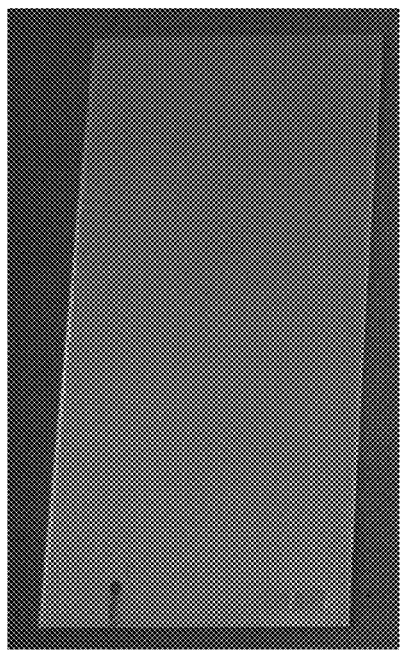
FIGS. 3A-3E are photographs of anodized aluminum test panels.

Panels C1, C2 and C3 (collectively the C-series of panels) were immersed in hot (between 190° F. and 200° F.) dichromate solution and were set aside as a second control. FIG. 3A represents one panel of the C-series of panels following application of hot dichromate.

Figure 3B:
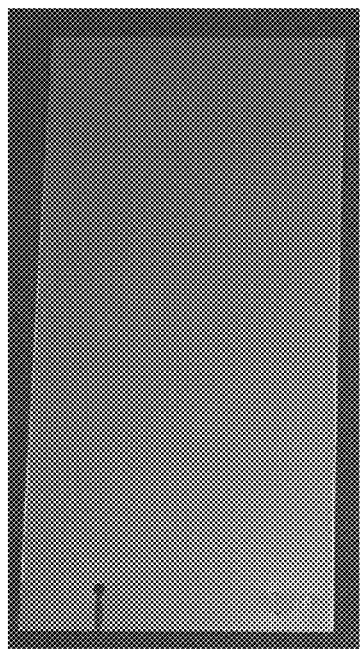

Panels W1, W2 and W3 (collectively the W-series of panels) were immersed in hot (between 190° F. and 200° F.) deionized water and were set aside as a first control. FIG. 3B represents one panel of the W-series panels following application of hot deionized water.

Figure 3C:
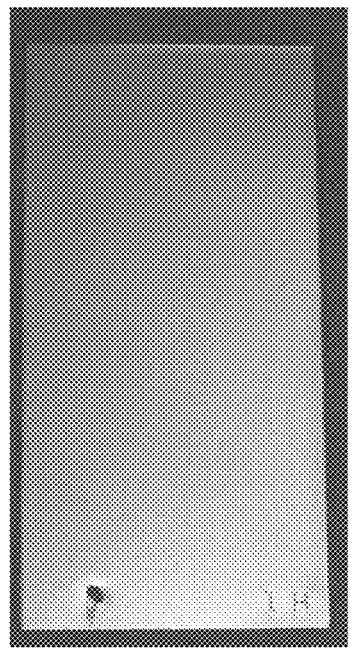

Panels H1, H2 and H3 (collectively the H-series of panels) were immersed in a hot (between 190° F. and 200° F.) solution of the corrosion inhibiting composition of Example 1. FIG. 3C represents one panel of the H-series of panels following application of hot corrosion inhibiting composition of Example 1.

Figure 3D:
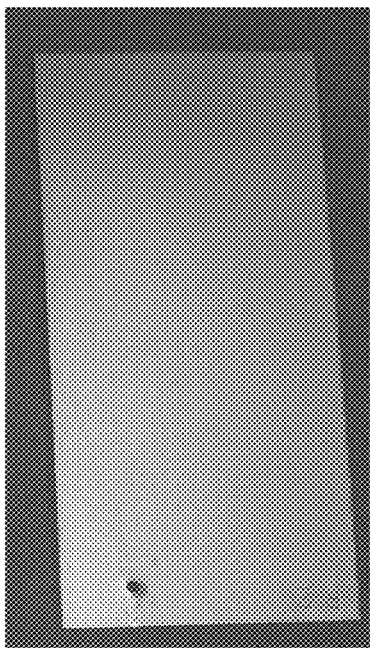

Panels R1, R2 and R3 (collectively the R-series of panels) were immersed in a room temperature (between 64° F. and 75° F.) solution of the corrosion inhibiting composition of Example 1. FIG. 3D represents one panel of the R-series of panels following application of room temperature corrosion inhibiting composition of Example 1.

Figure 3E:
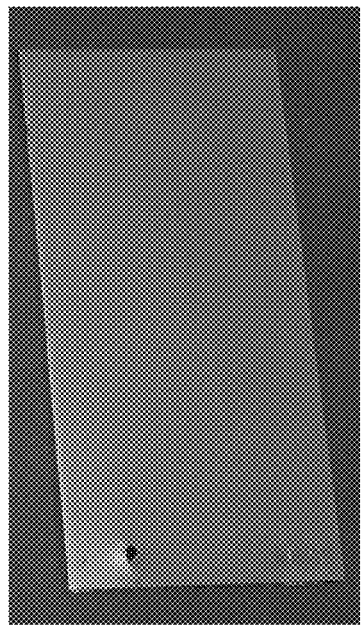

Panels S1, S2 and S3 (collectively the S-series of panels) were wiped (brushed using a paintbrush) with a solution of the corrosion inhibiting composition of Example 2. After 1 hour of dwell time, Panels S1-S3 were wiped with clean, dry cheesecloth. A second wiping followed with clean cheesecloth moistened with acetone. FIG. 3E represents one panel of the S-series of panels following application of corrosion inhibiting composition of Example 2.

The fifteen test panels (Panels W1-W3, Panels C1-C3, Panels H1-H3, Panels R1-R3 and Panels S1-S3) were aged for 24 hours before being placed into a neutral salt fog chamber in accordance with ASTM B117. The panels were observed, and representative photographs of the W-series of panels, the C-series of panels, the H-series of panels, the R-series of panels and the S-series of panels were taken after 1 week, 3 weeks, 5 weeks, 6 weeks, 7 weeks, 8 weeks, and 10 weeks of salt fog exposure.

Figure 4:
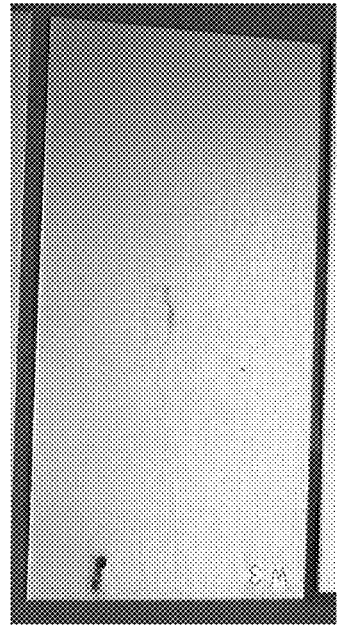
FIG. 4 is a photograph of one anodized aluminum test panel subjected to salt spray (fog) testing for 1 week.
Figure 5A:
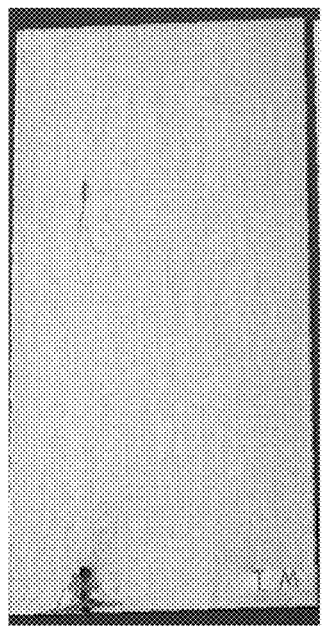
FIGS. 5A-5E are photographs of anodized aluminum test panels subjected to salt spray (fog) testing for 3 weeks.
Figure 5B:
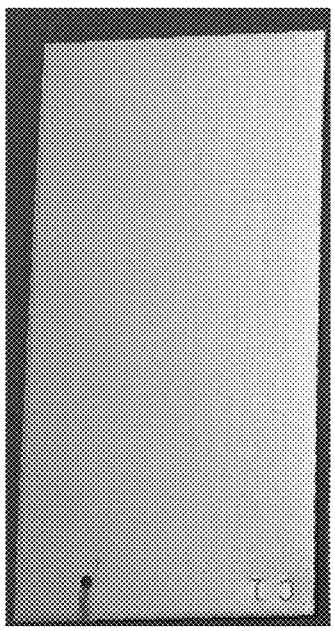
Figure 5C:
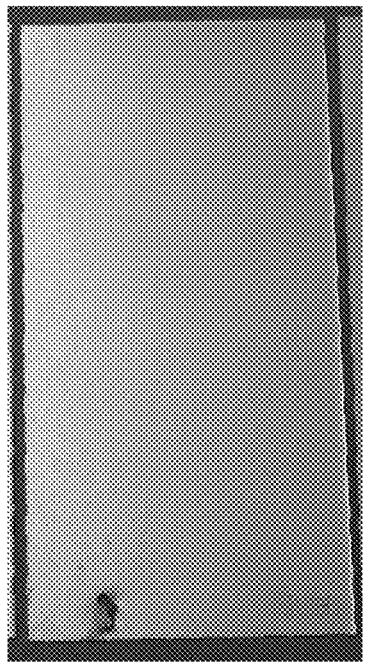
Figure 5D:
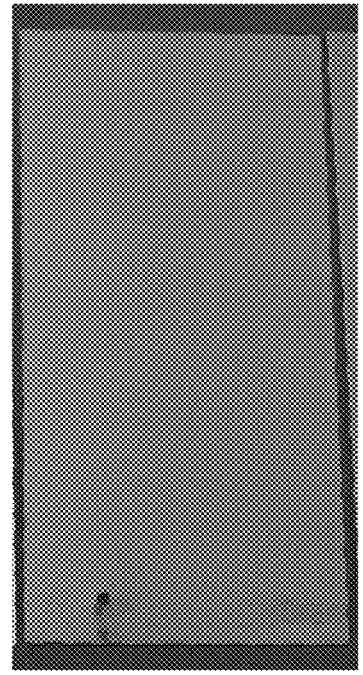
Figure 5E:
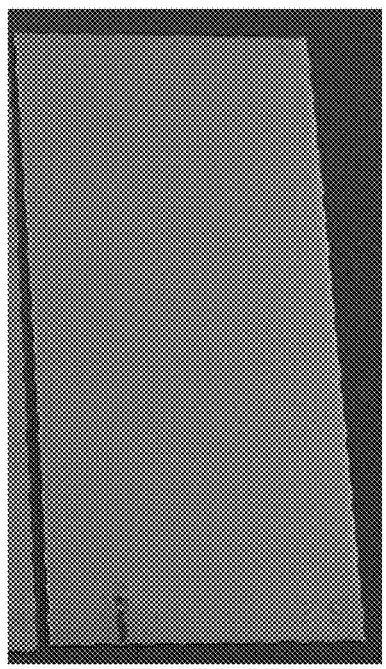
Figure 6A:
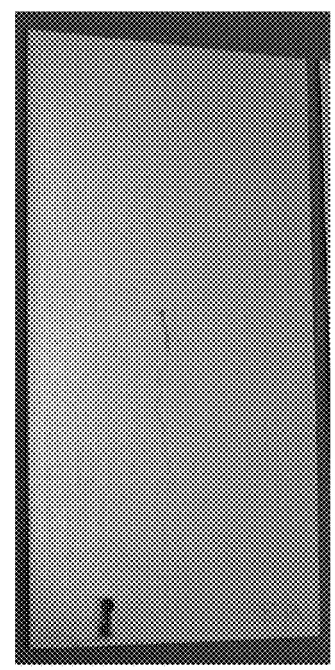
FIGS. 6A-6E are photographs of anodized aluminum test panels subjected to salt spray (fog) testing for 5 weeks.
Figure 6B:
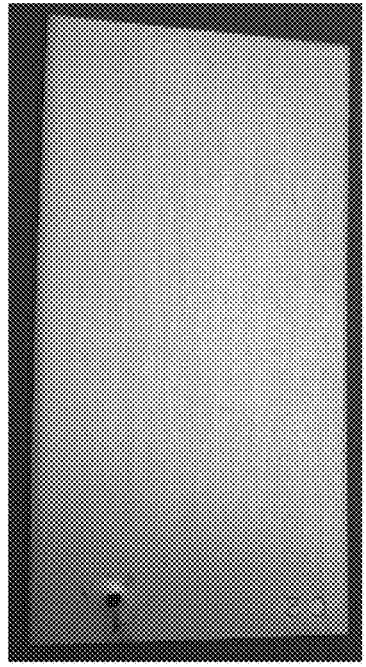
Figure 6C:
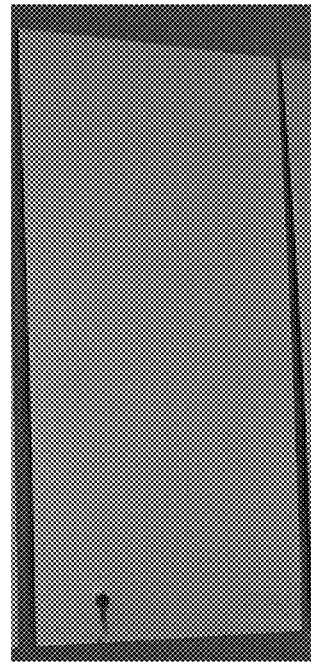
Figure 6D:
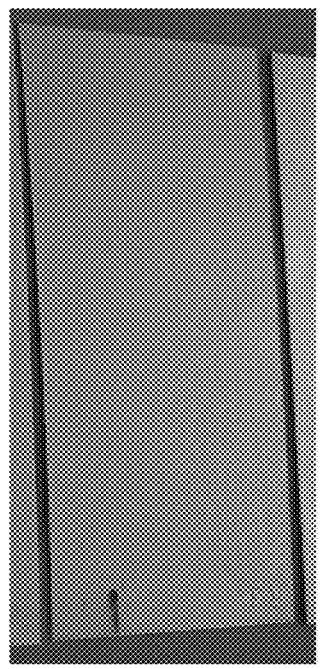
Figure 6E:
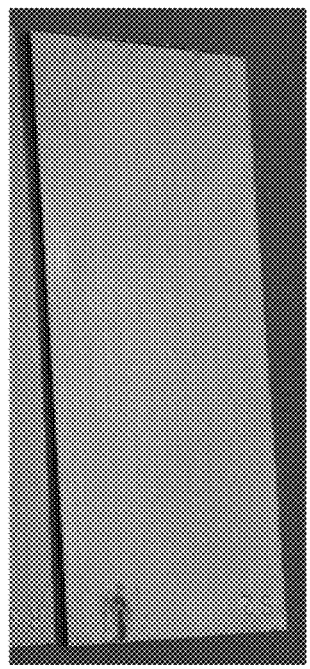

FIG. 4 represents one panel of the W-series of panels after 1 week of salt fog exposure. After 1 week of salt fog exposure, the W-series of panels (Panels W1-W3 treated with hot water) started to exhibit signs of corrosion, particularly about a central region, as illustrated in FIG. 4. After 2 weeks of salt fog exposure, the W-series of panels exhibited pitting.

FIGS. 5A, 5B, 5C, 5D and 5E represent one panel of the W-series of panels, one panel of the C-series of panels, one panel of the H-series of panels, one panel of the R-series of panels and one panel of the S-series of panels, respectively, after 3 weeks of salt fog exposure.

FIGS. 6A, 6B, 6C, 6D and 6E represent one panel of the W-series of panels, one panel of the C-series of panels, one panel of the H-series of panels, one panel of the R-series of panels and one panel of the S-series of panels, respectively, after 5 weeks of salt fog exposure. After 5 weeks of salt fog exposure, the H-series of panels (Panels H1-H3 treated with hot corrosion inhibiting composition of Example 1), the R-series of panels (Panels R1-R3 treated with room temperature corrosion inhibiting composition of Example 1) and the S-series of panels (Panels S1-S3 treated with corrosion inhibiting composition of Example 2) continued to pass testing. This significantly exceeds the requirement of MIL-A-8625 (i.e., that a test panel must pass 2 weeks of neutral salt spray exposure). The H-series of panels, the R-series of panels and the S-series of panels (panels treated with the disclosed corrosion inhibiting composition) showed significantly less corrosion than the W-series of panels (Panels W1-W3 treated with hot water) and exhibited similar corrosion inhibition to that of the C-series of panels (Panels C1-C3 treated with dichromate).

Figure 7A:
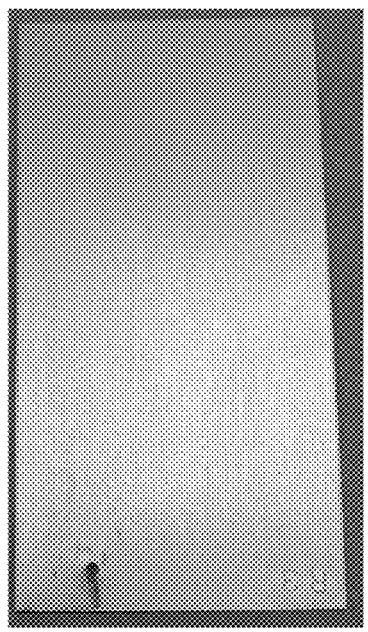
FIGS. 7A and 7B are photographs of two anodized aluminum test panels subjected to salt spray (fog) testing for 6 weeks.
Figure 7B:
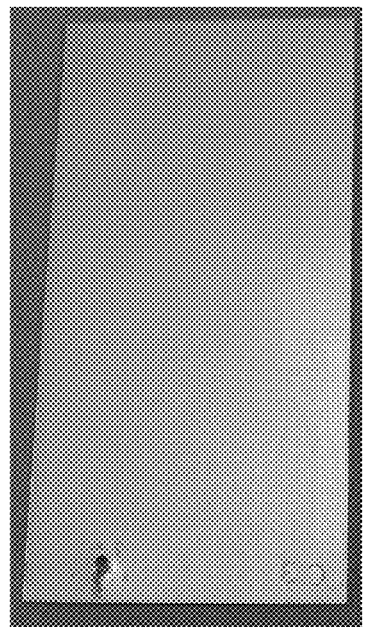

FIGS. 7A and 7B represent one panel of the R-series of panels and one panel of the C-series of panels, respectively, after 6 weeks of salt fog exposure.

Figure 8A:
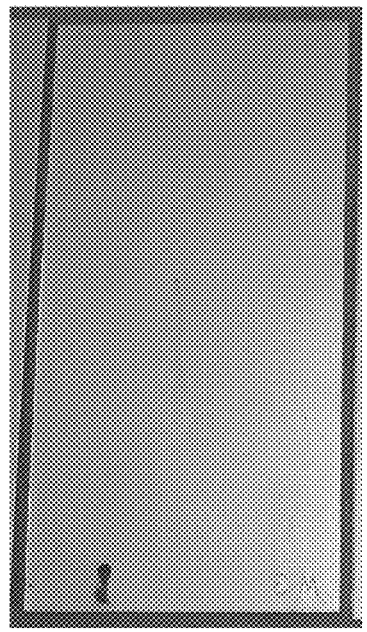
FIGS. 8A-8E are photographs of anodized aluminum test panels subjected to salt spray (fog) testing for 7 weeks.
Figure 8B:
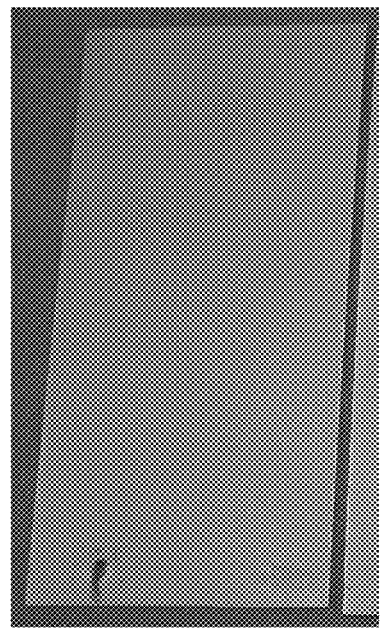
Figure 8C:
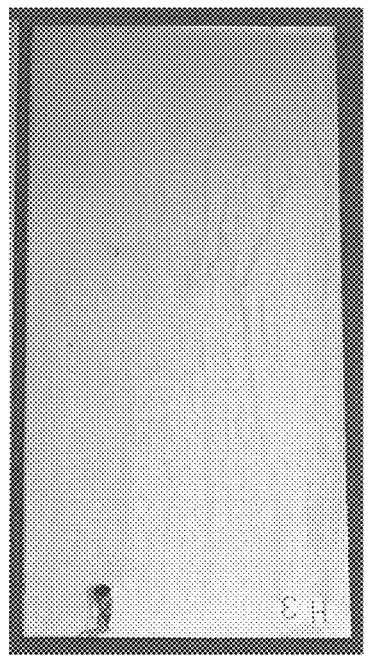
Figure 8D:
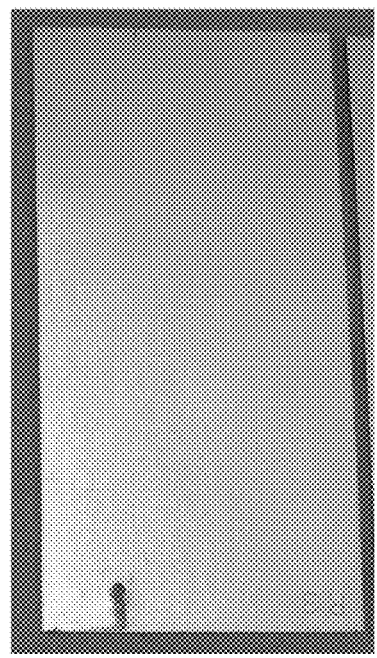
Figure 8E:
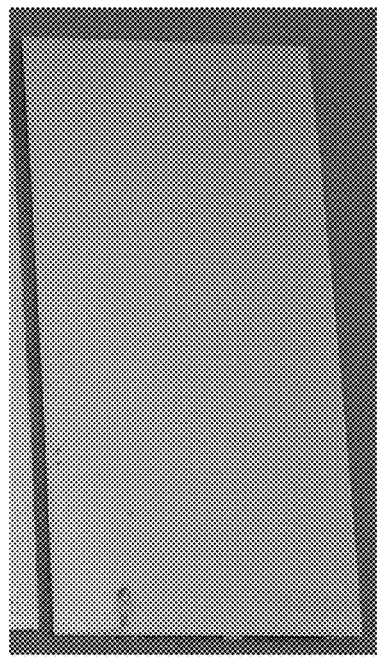

FIGS. 8A, 8B, 8C, 8D and 8E represent one panel of the W-series of panels, one panel of the C-series of panels, one panel of the H-series of panels, one panel of the R-series of panels and one panel of the S-series of panels, respectively, after 7 weeks of salt fog exposure. After 7 weeks of salt fog exposure, the H-series of panels started to exhibit corrosion (i.e., started to fail), as illustrated in FIG. 8C.

Figure 9A:
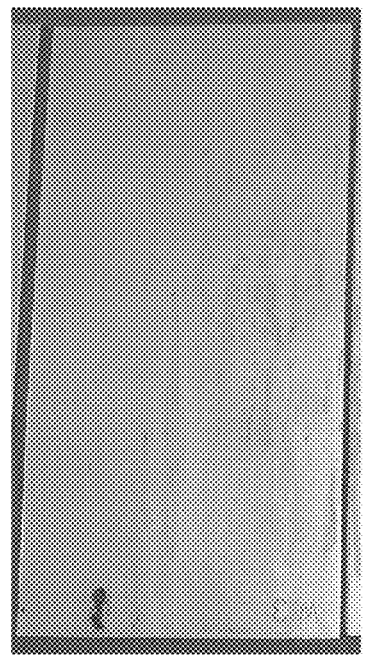
FIGS. 9A-9E are photographs of anodized aluminum test panels subjected to salt spray (fog) testing for 8 weeks.
Figure 9B:
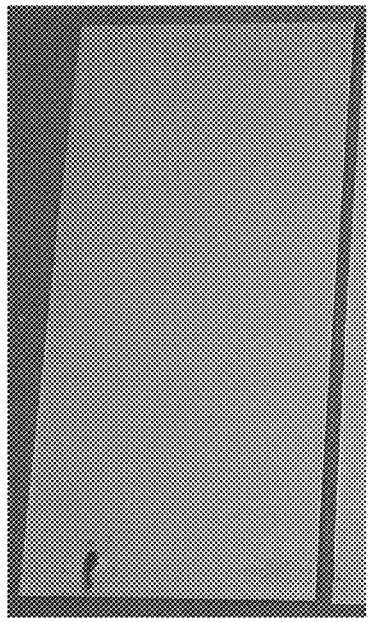
Figure 9C:
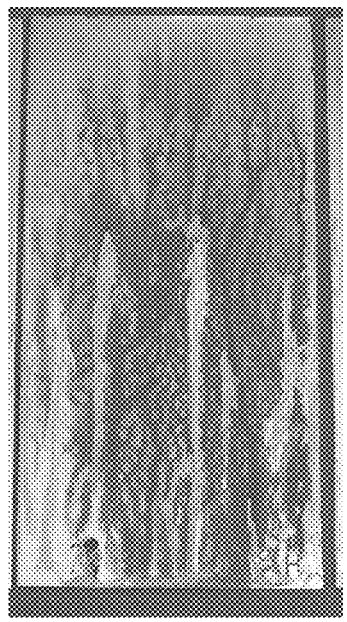
Figure 9D:
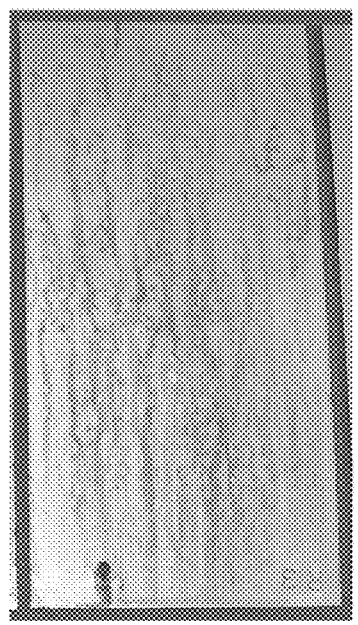
Figure 9E:
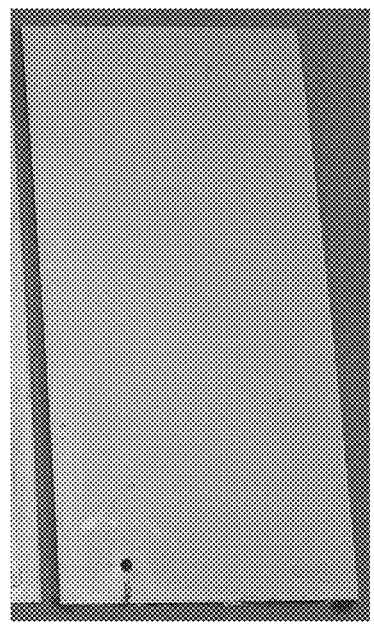

FIGS. 9A, 9B, 9C, 9D and 9E represent one panel of the W-series of panels, one panel of the C-series of panels, one panel of the H-series of panels, one panel of the R-series of panels and one panel of the S-series of panels, respectively, after 8 weeks of salt fog exposure. After 8 weeks of salt fog exposure, the W-series of panels, the H-series of panels and the R-series of panels exhibited pitting (i.e., failed), as illustrated in FIG. 9A, FIG. 9C and FIG. 9D, respectively. After 8 weeks of salt fog exposure, the C-series of panels and the S-series of panels continued to pass testing in accordance with MIL-C-8625, as illustrated in FIG. 9B and FIG. 9E, respectively.

Figure 10A:
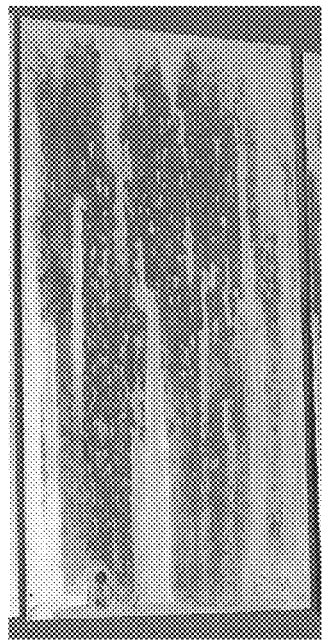
FIGS. 10A-10E are photographs of anodized aluminum test panels subjected to salt spray (fog) testing for 10 weeks.
Figure 10B:
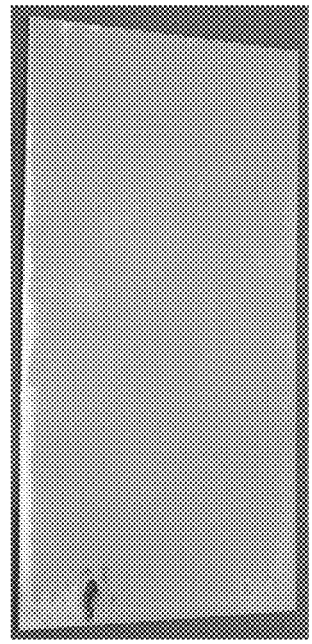
Figure 10C:
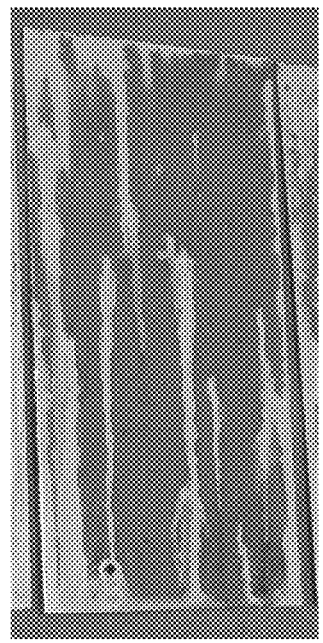
Figure 10D:
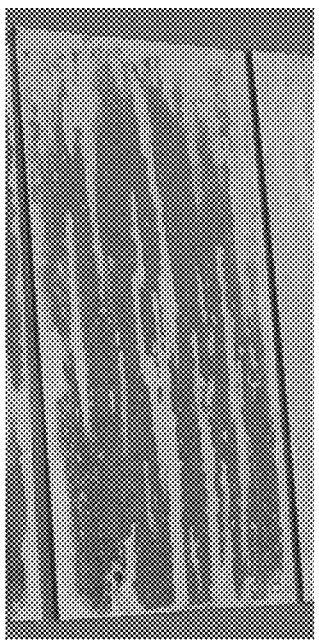
Figure 10E:
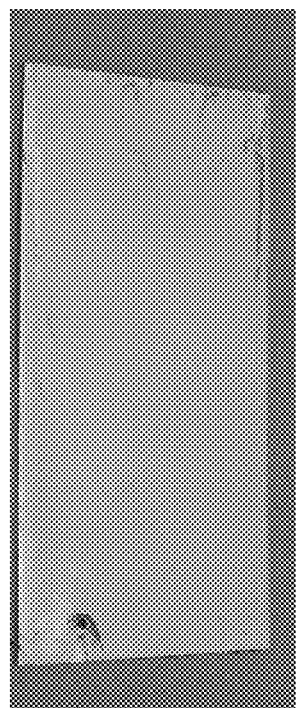

FIGS. 10A, 10B, 10C, 10D and 10E represent one panel of the W-series of panels, one panel of the C-series of panels, one panel of the H-series of panels, one panel of the R-series of panels and one panel of the S-series of panels, respectively, after 10 weeks of salt fog exposure. After 10 weeks of salt fog exposure, the C-series of panels and the S-series of panels continued to pass testing in accordance with MIL-C-8625, as illustrated in FIG. 10B and FIG. 10E, respectively.

Accordingly, the disclosed corrosion inhibiting composition and method for inhibiting corrosion may advantageously inhibit corrosion of anodized structures, such as anodized aluminum. Further, the disclosed examples demonstrate that use of electrically conductive nanomaterial (e.g., graphene nanomaterials) as a corrosion inhibiting composition to seal the oxide layer of an anodized structure can exceed the MIL requirements without the use of hexavalent chromium.

Although various aspects of the disclosed composition and method for inhibiting corrosion of an anodized structure have been shown and described, modifications may occur to those skilled in the art upon reading the specification. The present application includes such modifications and is limited only by the scope of the claims.

What is claimed is:

1. A method for inhibiting corrosion of an anodized material, said anodized material comprising a substrate having an oxide layer, said oxide layer comprising pores and defining an external surface, said method comprising:
    applying directly to said oxide layer a corrosion inhibiting composition comprising:
        a liquid carrier; and
        an electrically conductive carbon nanomaterial dispersed in said liquid carrier, wherein said electrically conductive carbon nanomaterial comprises at least one of nanoplatelets, nanotubes and nanorods, and wherein said applying step results in presence of said electrically conductive carbon nanomaterial in said pores; and
    removing said corrosion inhibiting composition from said external surface without removing said corrosion inhibiting composition from said pores,
    wherein, after said removing step, corrosion of said anodized material is inhibited to an extent sufficient to pass two weeks of neutral salt spray exposure in accordance with ASTM B117.

2. The method of claim 1 wherein said substrate comprises aluminum.

3. The method of claim 2 wherein said oxide layer comprises aluminum oxide.

4. The method of claim 1 wherein said applying step comprises brushing said corrosion inhibiting composition onto said oxide layer.

5. The method of claim 1 wherein said removing step comprises at least one of wiping and washing.

6. The method of claim 1 wherein said removing step is performed after expiration of a dwell time of at least 30 minutes.

7. The method of claim 6 wherein said dwell time is at least 60 minutes.

8. The method of claim 1 wherein said applying step comprises immersing said anodized material in said corrosion inhibiting composition.

9. The method of claim 1 further comprising drying said corrosion inhibiting composition.

10. The method of claim 1 further comprising heating said corrosion inhibiting composition to a temperature of between 190° F. and 200° F. prior to said applying step.

11. The method of claim 1 wherein said corrosion inhibiting composition is constantly agitated during said applying step.

12. The method of claim 1 wherein said liquid carrier comprises ethoxylated alcohol.

13. The method of claim 1 wherein said liquid carrier has a surface tension of at most 35 dynes/cm.

14. The method of claim 1 wherein said liquid carrier has a surface tension of at most 25 dynes/cm.

15. The method of claim 1 wherein said electrically conductive carbon nanomaterial comprises graphene nanoplatelets.

16. The method of claim 15 wherein said graphene nanoplatelets have a thickness between 2 nanometers and 10 nanometers.

17. The method of claim 1 wherein said liquid carrier comprises deionized water.

18. The method of claim 1 wherein said liquid carrier comprises penetrant solution, and wherein a weight ratio of said liquid carrier to said electrically conductive carbon nanomaterial ranges from about 120:1 to about 30:1.

19. The method of claim 1 wherein said electrically conductive carbon nanomaterial is dispersed in said liquid carrier at a concentration ranging from 1 to 10 grams of said electrically conductive carbon nanomaterial per liter of said liquid carrier.

20. The method of claim 1 wherein said electrically conductive carbon nanomaterial is dispersed in said liquid carrier at a concentration ranging from 2 to 5 grams of said electrically conductive carbon nanomaterial per liter of said liquid carrier.

* * * * *